(12) United States Patent
Tamizhmani et al.

(10) Patent No.: US 12,191,806 B2
(45) Date of Patent: Jan. 7, 2025

(54) AUTONOMOUS POLARIMETRIC IMAGING FOR PHOTOVOLTAIC MODULE INSPECTION AND METHODS THEREOF

(71) Applicant: ARIZONA BOARD OF REGENTS ON BEHALF OF ARIZONA STATE UNIVERSITY, Scottsdale, AZ (US)

(72) Inventors: Govindasamy Tamizhmani, Gilbert, AZ (US); Yu Yao, Chandler, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

(21) Appl. No.: 17/899,348

(22) Filed: Aug. 30, 2022

(65) Prior Publication Data

US 2023/0119076 A1 Apr. 20, 2023

Related U.S. Application Data

(60) Provisional application No. 63/239,646, filed on Sep. 1, 2021.

(51) Int. Cl.
*H02S 50/15* (2014.01)
*G06T 7/00* (2017.01)
(Continued)

(52) U.S. Cl.
CPC ............ *H02S 50/15* (2014.12); *G06T 7/0008* (2013.01); *H04N 7/183* (2013.01); *H04N 23/56* (2023.01);
(Continued)

(58) Field of Classification Search
CPC .................. H02S 50/15; G06T 7/0008; G06T 2207/10032; G06T 2207/30108;
(Continued)

(56) References Cited

U.S. PATENT DOCUMENTS 5,334,844 A * 8/1994 Pollard .............. G01N 21/8806
136/290
7,259,778 B2 * 8/2007 Arpa ...................... H04N 7/181
348/139
(Continued)

FOREIGN PATENT DOCUMENTS

CN 213754436 U * 7/2021
CN 214101548 U * 8/2021

OTHER PUBLICATIONS

Lawrence B Wolff and Andreas G Andreou "Polarization camera sensors", Elsevier Science B.V. Image and Vision Computing vol. 13 No. Aug. 6, 1995 (Year: 1995).*

*Primary Examiner* — Richard A Hansell, Jr.
(74) *Attorney, Agent, or Firm* — MH2 Technology Law Group LLP

(57) ABSTRACT

A method for inspection for a photovoltaic module or cell is disclosed. The method includes acquiring one or more polarimetric images of the photovoltaic module or cell using a camera which may include a polarization sensor, analyzing the one or more polarimetric images, and identifying a presence of a defect in the photovoltaic module or cell. A device for inspection for a photovoltaic module or cell is also disclosed, wherein the device includes a camera having a polarimetric sensor and is configured to be positioned at one or more locations relative to a location of the photovoltaic module or cell.

15 Claims, 7 Drawing Sheets

(51) Int. Cl.
*H04N 7/18* (2006.01)
*H04N 23/56* (2023.01)
*H04N 23/695* (2023.01)

(52) U.S. Cl.
CPC . *H04N 23/695* (2023.01); *G06T 2207/10032* (2013.01); *G06T 2207/30108* (2013.01)

(58) Field of Classification Search
CPC ...... H04N 7/183; H04N 23/56; H04N 23/695; G01N 21/956; G01N 21/8851; G01N 2021/8848; G01N 2021/8883; G01N 2021/8887; G01N 21/21; Y02E 10/50
See application file for complete search history.

(56) References Cited

U.S. PATENT DOCUMENTS

| | | | | |
|---|---|---|---|---|
| 7,701,488 | B2* | 4/2010 | Chen | H04N 23/66 |
| | | | | 348/211.99 |
| 10,475,038 | B1* | 11/2019 | Osborn | G06Q 20/042 |
| 10,733,718 | B1* | 8/2020 | Lerman | G06T 7/55 |
| 2003/0025725 | A1* | 2/2003 | Nie | G06F 9/004 |
| | | | | 715/719 |
| 2006/0065820 | A1* | 3/2006 | Nagai | G01R 33/032 |
| | | | | 250/225 |
| 2007/0073439 | A1* | 3/2007 | Habibi | G05B 19/4182 |
| | | | | 700/213 |
| 2010/0004773 | A1* | 1/2010 | Kochergin | G01N 21/211 |
| | | | | 700/103 |
| 2011/0205539 | A1* | 8/2011 | Cattelan | G01N 21/211 |
| | | | | 356/364 |
| 2011/0310244 | A1* | 12/2011 | Schweitzer | H02S 50/15 |
| | | | | 348/92 |
| 2013/0035881 | A1* | 2/2013 | Hoo | H02S 50/10 |
| | | | | 702/58 |
| 2015/0219498 | A1* | 8/2015 | Tillotson | G01J 3/2823 |
| | | | | 356/364 |
| 2015/0346083 | A1* | 12/2015 | Matsumoto | G01N 21/8851 |
| | | | | 356/369 |
| 2016/0359068 | A1* | 12/2016 | Bedell | H01L 31/0504 |
| 2017/0118025 | A1* | 4/2017 | Shastri | H04L 9/00 |
| 2017/0160737 | A1* | 6/2017 | Towal | G05D 1/0011 |
| 2017/0176323 | A1* | 6/2017 | Murayama | G01N 21/21 |
| 2018/0191932 | A1* | 7/2018 | Schubert | G01J 3/0224 |
| 2019/0162675 | A1* | 5/2019 | Shin | H01L 21/6719 |
| 2019/0287238 | A1* | 9/2019 | Sriraman | G06N 20/00 |
| 2020/0050833 | A1* | 2/2020 | Ogasawara | G06V 10/60 |
| 2020/0304707 | A1* | 9/2020 | Williams | G06N 3/088 |
| 2020/0401839 | A1* | 12/2020 | Ogasawara | G01N 21/55 |
| 2021/0032764 | A1* | 2/2021 | Ng | C25B 9/65 |
| 2021/0098641 | A1* | 4/2021 | Sewell | H01L 31/18 |
| 2021/0356572 | A1* | 11/2021 | Kadambi | G06T 7/50 |
| 2022/0205938 | A1* | 6/2022 | Michini | G05D 1/689 |
| 2023/0049577 | A1* | 2/2023 | Gruev | G01J 4/04 |
| 2024/0030869 | A1* | 1/2024 | Kobayashi | H02S 50/15 |

* cited by examiner

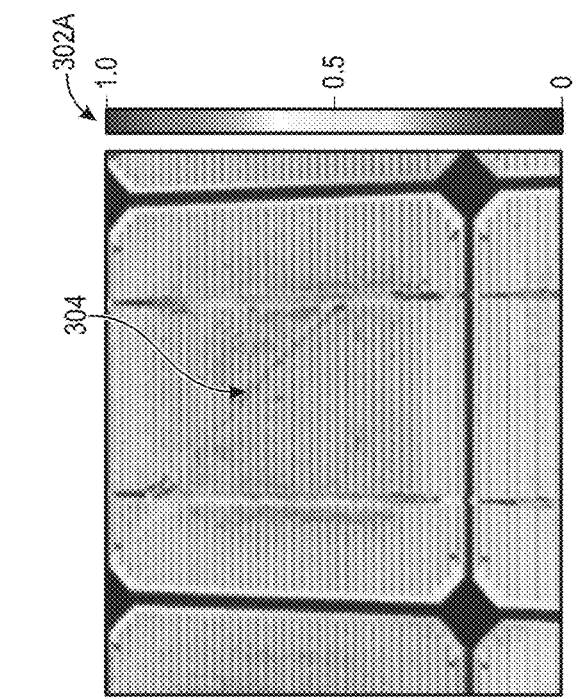
FIG. 3C
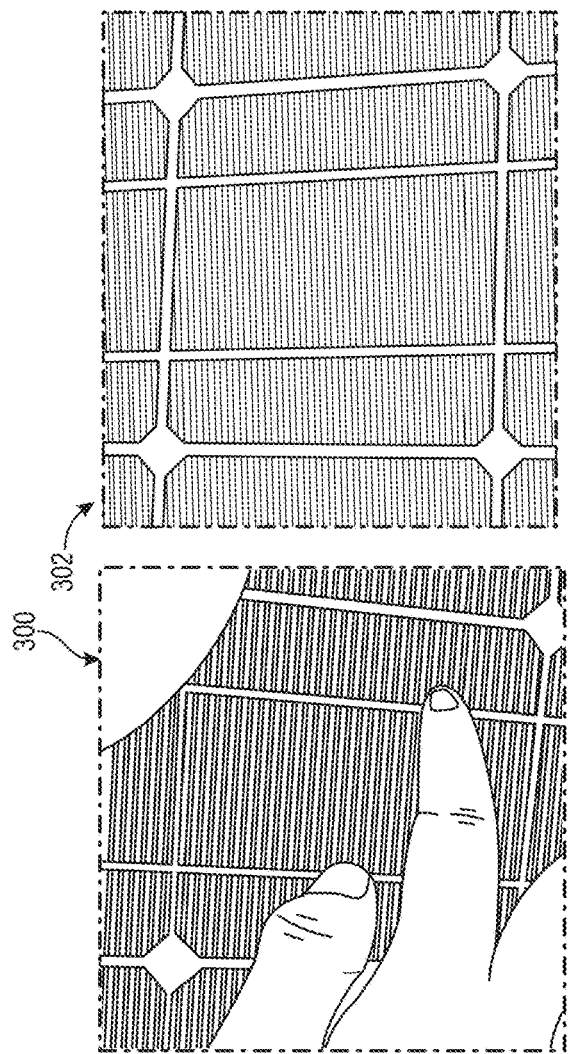
FIG. 3B
FIG. 3A

AUTONOMOUS POLARIMETRIC IMAGING FOR PHOTOVOLTAIC MODULE INSPECTION AND METHODS THEREOF

CROSS-REFERENCE TO RELATED APPLICATIONS

This application claims to the benefit of U.S. Provisional Patent Application No. 63/239,646, filed on Sep. 1, 2021, which is hereby incorporated by reference in its entirety.

TECHNICAL FIELD

The present teachings relate generally to photovoltaic (PV) module manufacturing quality control and field failure analysis and, more particularly, to polarimetric imaging-based techniques and methods to evaluate photovoltaic voltaic (PV) module manufacturing quality control.

BACKGROUND

Conventional techniques for PV cell and module inspection, such as visual inspection, electroluminescence (EL), infrared (IR) and UV fluorescence (UVF) imaging methods, are used for PV cell and module inspection. However, these state-of-art techniques are limited by indoor and/or outdoor light conditions, interruptive operation, high cost, low speed, and accuracy.

Available systems employing enhanced imaging systems could find utility if they provided non-interruptive, rapid, and accurate inspection of PV cells and modules, particularly under prevailing room light or sunlight conditions. Application of improved imaging technology to PV manufacturing and plants for optical inspections of various PV module defects could yield high speed, low cost, and inline operation techniques. The monitoring of degradation or failure of individual modules could therefore result in reduced costs related to operation and maintenance (O&M) associated with PV modules by providing efficient identification, prioritization, and preparation of module replacement. Moreover, the application of the enhanced imaging techniques for manufacturing quality control may help to extend system lifetime by identifying and eliminating the defective modules, thus, enabling amortization of initial capital costs over a longer timeframe by improving lifetime of PV systems.

Thus, a method of and apparatus for rapid and effective inspection technology to screen and characterize PV modules for both manufacturing quality control and PV plant operation and maintenance (O&M) would be desirable.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A method for inspection for a photovoltaic module or cell is disclosed. The method includes acquiring one or more polarimetric images of the photovoltaic module or cell using a camera which may include a polarization sensor, analyzing the one or more polarimetric images, and identifying a presence of a defect in the photovoltaic module or cell.

The method for inspection for a photovoltaic module or cell may also include inputting a first location of the camera into a predetermined model, inputting a first location of the photovoltaic module or cell into the predetermined model, and adjusting the first location of the camera to a second location of the camera based on an output of the predetermined model prior to acquiring one or more polarimetric images of the photovoltaic module or cell. The second location of the camera may be within 20 degrees of the first location of the camera. The method for inspection for a photovoltaic module or cell may include determining no defect is present in the photovoltaic module or cell, and adjusting a first location of the camera to a second location of the camera based on an output of the predetermined model prior to acquiring one or more polarimetric images of the photovoltaic module or cell. Acquiring the one or more polarimetric images is completed from more than one location relative to a location of the photovoltaic module or cell. Analyzing the one or more polarimetric images may also include fitting the one or more polarimetric images to a mathematical model. Analyzing the one or more polarimetric images may be done by visual inspection. Analyzing the one or more polarimetric images may be done by an image processing algorithm. The method for inspection for a photovoltaic module or cell may include providing a prediction of expected life of the photovoltaic module or cell based on a quantitative measurement of the defect. The method for inspection for a photovoltaic module or cell may include providing loss of efficiency of the photovoltaic module or cell based on a quantitative measurement of the defect. Acquiring one or more polarimetric images of the photovoltaic module or cell may use no external light source. Acquiring one or more polarimetric images of the photovoltaic module or cell may use an external light source. Analyzing the one or more polarimetric images may include correlating a defect present to a geographical location of the photovoltaic module or cell. Analyzing the one or more polarimetric images may include correlating a defect present to meteorological data associated with a geographical location of the photovoltaic module or cell. The defect may include a crack, a discoloration, a scratch, a surface contamination, a geometric change, an optical index change, or a combination thereof. The method for inspection for a photovoltaic module or cell may include transmitting data related to the defect to an external device.

Another method for inspection for a photovoltaic module or cell is disclosed. The method for inspection for a photovoltaic module or cell also may include acquiring a first polarimetric image of the photovoltaic module or cell using a camera including a polarization sensor from a first location relative to a location of the photovoltaic module or cell, evaluating the first polarimetric image of the photovoltaic module or cell to determine if a defect is detectable in the first polarimetric image of the photovoltaic module or cell, acquiring a second polarimetric image of the photovoltaic module or cell using the camera from a second location relative to a location of the photovoltaic module or cell, analyzing the first polarimetric image and the second polarimetric image. The method also includes identifying a defect present in the photovoltaic module or cell.

A device for inspection for a photovoltaic module or cell is also disclosed. The device may include a camera having a polarimetric sensor. The device may include where the camera is configured to be positioned at one or more locations relative to a location of the photovoltaic module or cell. The device for inspection for a photovoltaic module or cell may include a transmitter configured to transmit data to an external device. The device for inspection for a photovoltaic module or cell may include a drone, to which the device is attached.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures:

FIG. 1A is a schematic of the measurement setup. FIG. 1B is a photograph of a photovoltaic panel with scratches introduced on the surface, as indicated with arrows. FIG. 1C is a degree of linear polarization (DOLP) polarimetric image of the same region as that in FIG. 1B, with scratches indicated. FIG. 1D is a photograph of a back sheet of a photovoltaic panel, with the inset illustrating a magnified image with some fine scratches as indicated. FIG. 1E is a full view of the inset of FIG. 1D. FIG. 1F is a DOLP polarimetric image of the same region as shown in the inset of FIG. 1D, with scratches indicated.

FIG. 2A is a conventional visible image, FIG. 2B is a DOLP polarimetric image showing the same region as FIG. 2A.

FIGS. 3A-3C illustrate a polarimetric imaging for detection of photovoltaic panel surface soiling level outdoor under skylight, according to an embodiment. FIG. 3A is an optical image of a PV cell crack on a PV panel under UV illumination in a dark room. FIG. 3B is a visible image showing the same region as FIG. 3A, and FIG. 3C is a DOLP polarimetric image of the same sample outdoor in daylight, with cracks indicated.

FIG. 4A is an optical image of a PV panel with delamination issues. FIG. 4B is a degree of circular polarization (DOCP) image of the same region, with the delamination regions indicated.

Figure 1A:
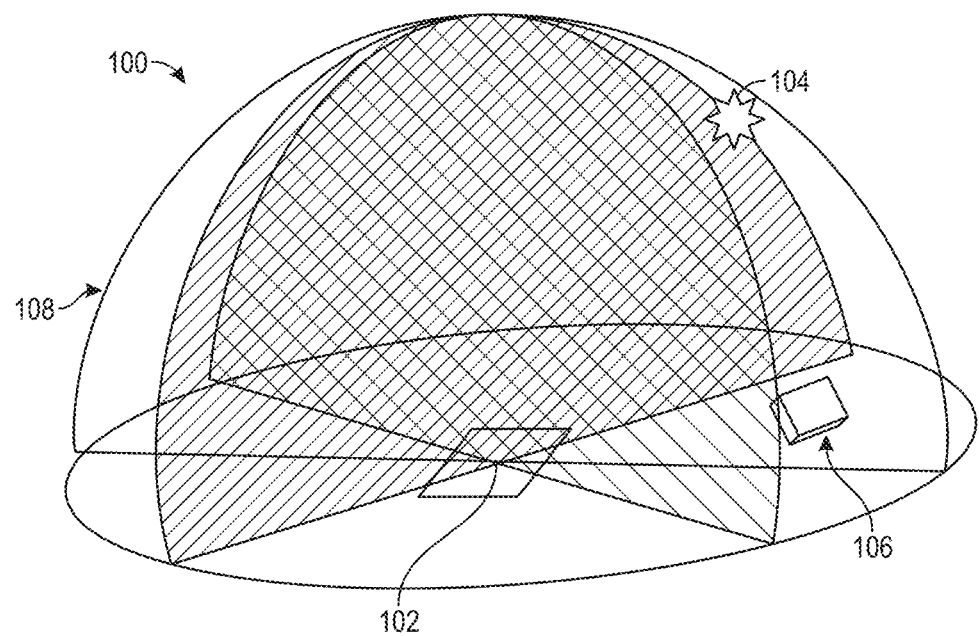
FIGS. 1A-1F illustrates a measurement setup for polarimetric imaging for detection of scratches on a front surface and back sheet of a photovoltaic module outdoors under sunlight, according to an embodiment.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

Successful development of enhanced imaging methods, such as polarimetric imaging-based techniques for photovoltaic (PV) module manufacturing quality control and field failure analysis, could contribute to the Solar Energy Technologies Office's (SETO) accelerated 2030 goal of $0.02/kWh levelized cost of energy (LCOE) for utility-scale PV systems. A levelized cost of energy is a term which describes the cost of the power produced by solar over a period of time. Solar panels, when exposed to the elements in the field, may exhibit over 80 types of defects, though the more prevalent defects include encapsulant browning, delamination, soiling, and cracks or scratches.

Embodiments and methods described herein are aimed at the development of polarimetric imaging-based techniques for photovoltaic (PV) module manufacturing quality control and field failure analysis. It is considered necessary and advantageous to utilize rapid and effective inspection technology to screen and characterize PV modules for both manufacturing quality control and PV plant operation and maintenance (O&M). Currently, conventional techniques, such as visual inspection, electroluminescence (EL), infrared (IR) and ultraviolet fluorescence (UVF) imaging methods, are used for PV cell and module inspection. These state-of-art techniques are limited by indoor/outdoor light condition, interruptive operation, high cost, low speed and accuracy. It is disclosed herein to apply ultra-compact polarimetric imaging systems for non-interruptive, rapid and accurate inspection of PV cells and modules under prevailing room light or sunlight conditions. To date, polarimetric imaging technology has yet to be applied to PV manufacturing and plants for optical inspections of various PV module defects with high speed, low cost and inline operation. The proposed inspection techniques and apparatus can be used in PV field inspection and therefore enable system operators to monitor degradation or failure of individual modules and may result in less costly O&M by efficient identification, prioritization, and preparation of module replacement. Moreover, the application of the proposed techniques for manufacturing quality control can help to extend the system lifetime by identifying and eliminating the defective modules, thereby allowing the initial capital costs to be amortized over a longer timeframe, which directly reduces LCOE by improving expected lifetime of PV systems from 30 to 50 years.

Currently, a variety of optical and electro-optical techniques and methods are used in manufacturing quality control and field failure analysis. These techniques and methods have several associated challenges and limitations. PV Cell cracks can affect both energy output and the lifetime of PV systems. They can occur both before and after installation due to mechanical stress, temperature variation, humidity, wind, and the like. Conventional EL-based approaches for measuring these defects are expensive, slow and intrusive. Back sheet scratches and cuts. Deep scratches and cuts in PV back sheets, some of which may be caused during packaging, would lead to dielectric breakdown and accelerated aging of PV modules. Conventional methods for measuring such defects are based on visible image methods and human inspection, which are limited by the trade-off between detection speed and accuracy due to insufficient contrast.

Anti-soiling coating (ASC) and Anti-reflection coating (ARC) scratches can be introduced in the packaging and/or handling processes and outdoor cleaning methods of PV modules. These defects can lead to reduced optical energy efficiency and accelerate the degradation of these surface coating layers. Conventional measurement methods are based on visual inspection, photographic images and, in rare instances, handheld UV-Vis-NIR reflectance spectroscopy. These methods and techniques can be slow, very expensive, and have reduced sensitivity as compared to other methods.

Encapsulant gel content defects and discoloration or delamination in the encapsulation layer may result in shortened PV system lifetimes. The current gel content determination and/or mapping technique used during manufacturing is intrusive—encapsulant sample must be removed from the laminated modules, slow—chemical method using xylene and other organic solvents, or very expensive—differential scanning calorimetry. Encapsulant delamination is usually not easy to detect at early stages of production. The discoloration of encapsulant browning can be detected by UVF, but it can be done only under dark conditions, either at night or in fully covered shade. The detection of soiling extent may provide feedback for O&M scheduling of PV plants. Conventional methods of measurement are based on human inspection, which are slow and labor-intensive, or on soiling loss monitoring stations, which do not identify the soiling non-uniformity from one module to the other and from one location of the plant to the other.

Embodiments herein provide a device and methods to provide polarimetric imaging-based methods for PV module manufacturing quality control and field failure analysis. The inspection techniques as described herein may be implemented in PV field inspection and enable system operators to monitor degradation or failure of individual modules and results in less costly O&M by rapid identification, prioritization, and preparation of module replacement. Moreover, application of the proposed methods and utilizations of devices in exemplary embodiments described herein for manufacturing quality control can enable system lifetime extension. As a result, initial capital costs of PV modules may then be amortized over a longer time frame, thus reducing LCOE, by improving lifetime from 30 to 50 years. These methods and devices may be integrated into polarimetric inspection system drones and/or robotics for automatic and high-speed inspection, enabling further collaboration with PV manufacturers and research laboratories for further performance of field tests and evaluation relating to a number of common PV module defects and manufacturing quality control attributes. These include rapid, non-invasive detection of PV cell cracks as an alternative to expensive and slow EL-based methods, rapid and sensitive detection for back sheets scratches, cuts, and cracks with improved accuracy as compared to visible imaging techniques, rapid and sensitive detection of scratches on PV surfaces anti-soiling coatings (ASC)/anti-reflection coatings (ARC) to prevent the associated accelerated panel degradation, rapid and inline detection of encapsulant discoloration and gel content to maximize PV module efficiency and reduction of failure rates, and rapid and accurate evaluation of mirror soiling conditions to provide feedback for O&M scheduling of PV plants.

Polarimetric imagers, as embodied herein, based on superpixel polarimetric imaging systems, as described in U.S. patent application Ser. No. 17/157,438 CHIRAL PLASMONIC METASURFACES FOR POLARIZATION DETECTION AND MANIPULATION, which is hereby incorporated by reference in its entirety, exhibits negligible weight and size increases (<0.1%) compared with conventional imagers. These methods and devices may be applied to determination and quantification of PV cell cracks, PV surface anti-soiling coating (ASC) and anti-reflection coating (ARC) scratches, encapsulant discoloration and gel content, backsheet scratches, and soiling level monitoring. The embodied inspection techniques may be used in PV field inspection and enable system operators to monitor degradation or failure of individual modules and results in less costly O&M by efficient identification, prioritization, and preparation of module replacement. Moreover, the application of the proposed methods and devices as described herein for manufacturing quality control can help to extend the system lifetime by identifying and eliminating the defective modules.

Figure 1B:
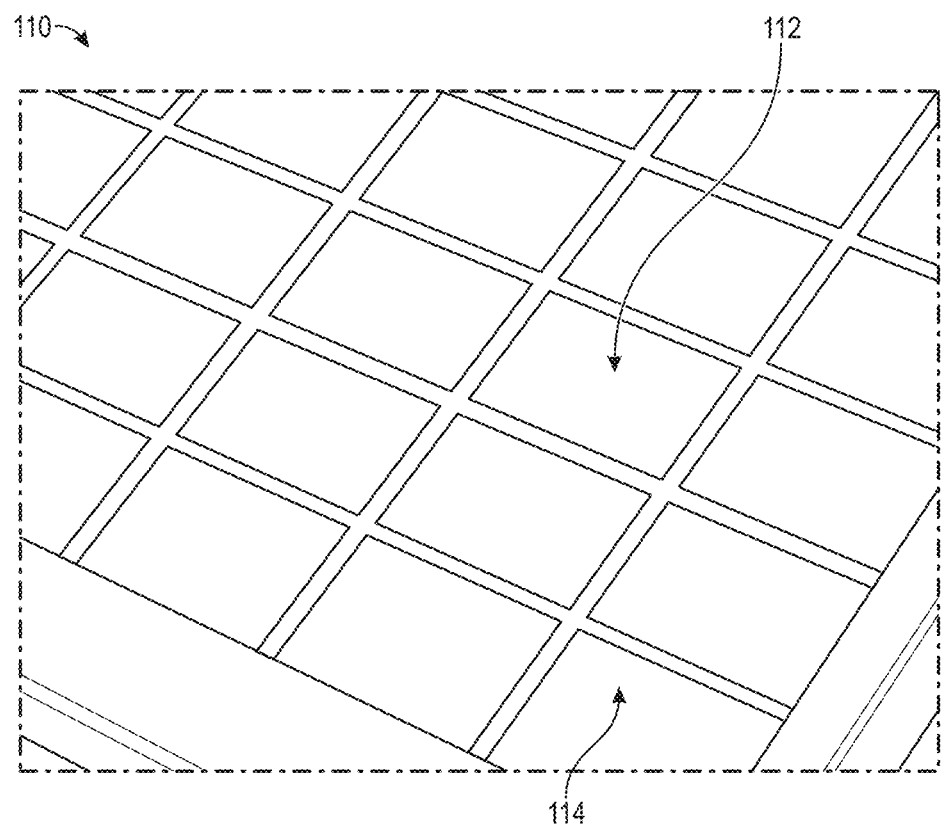
Figure 1C:
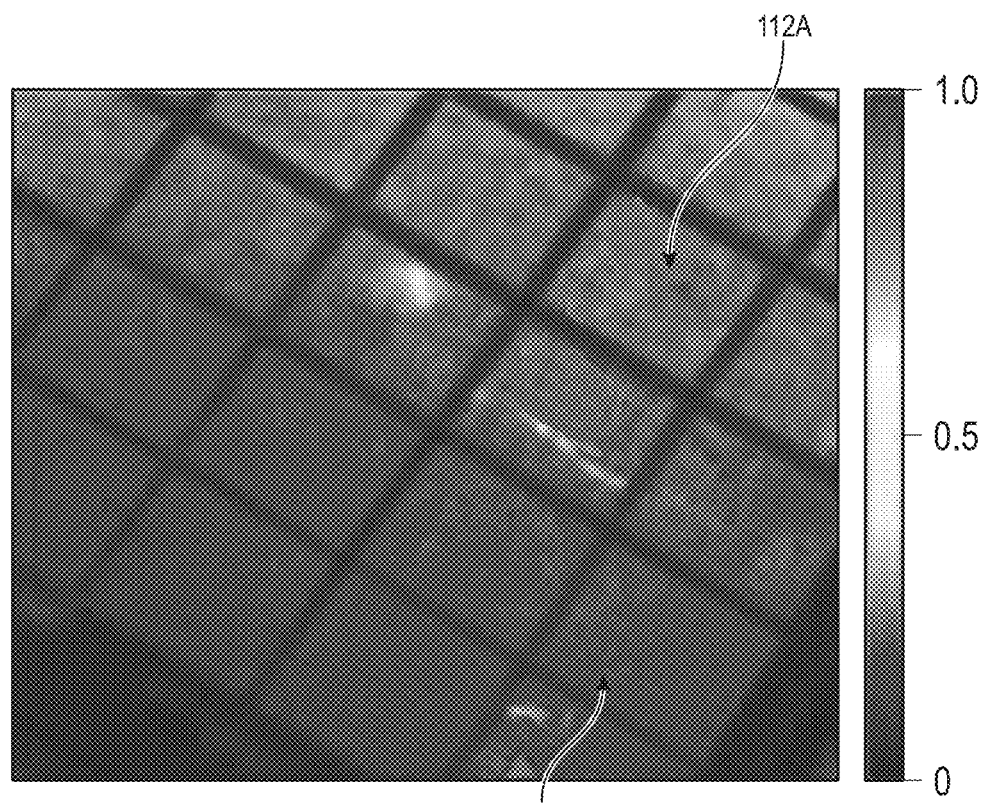
Figure 1D:
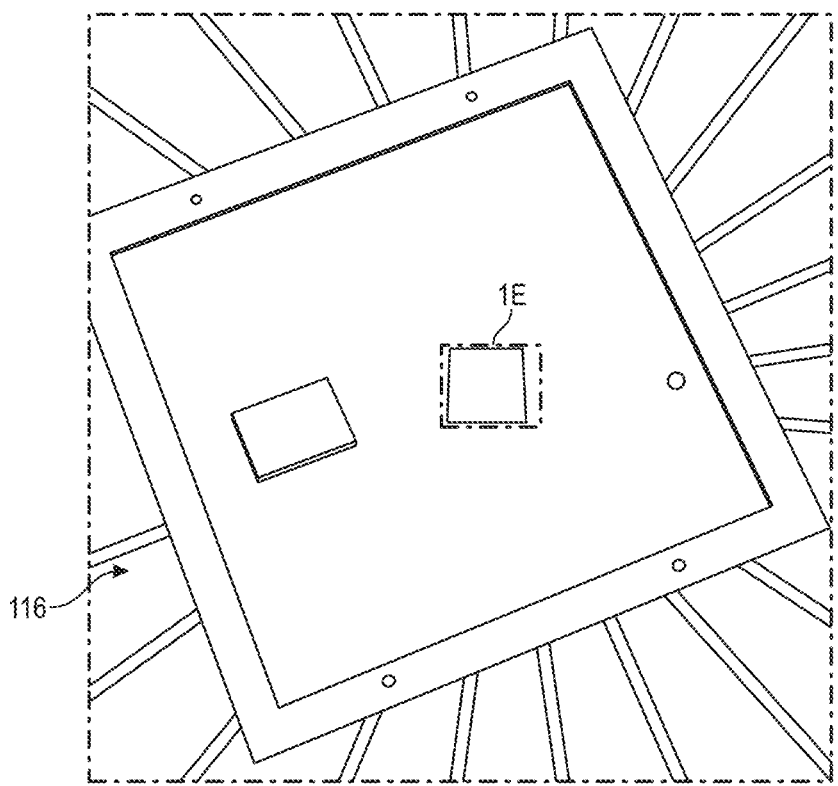
Figure 1E:
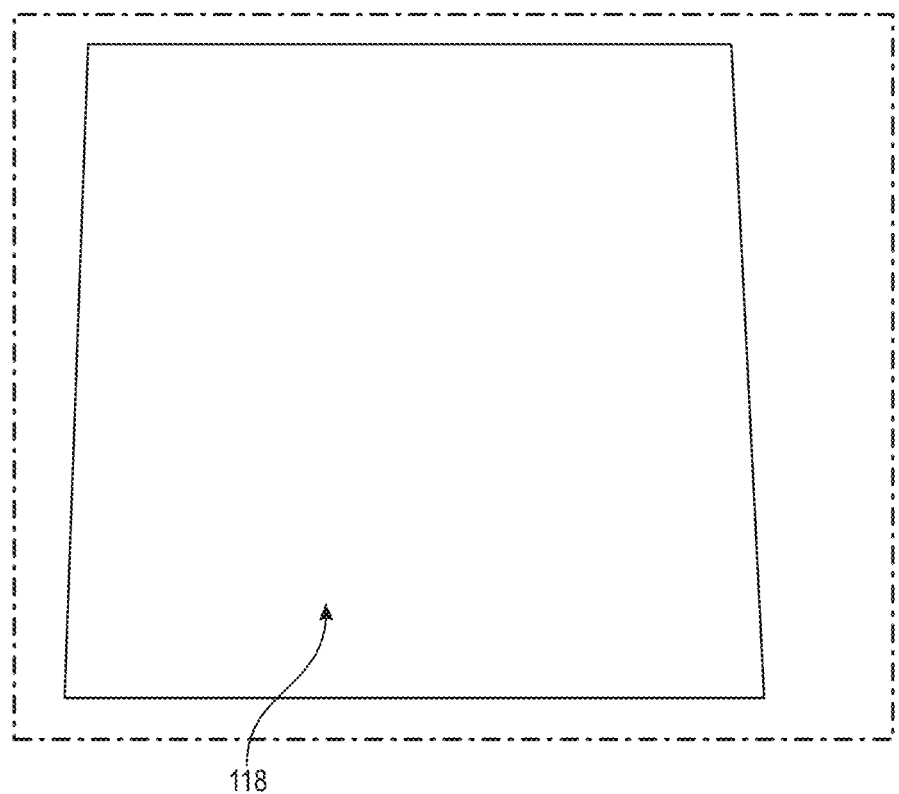
Figure 1F:
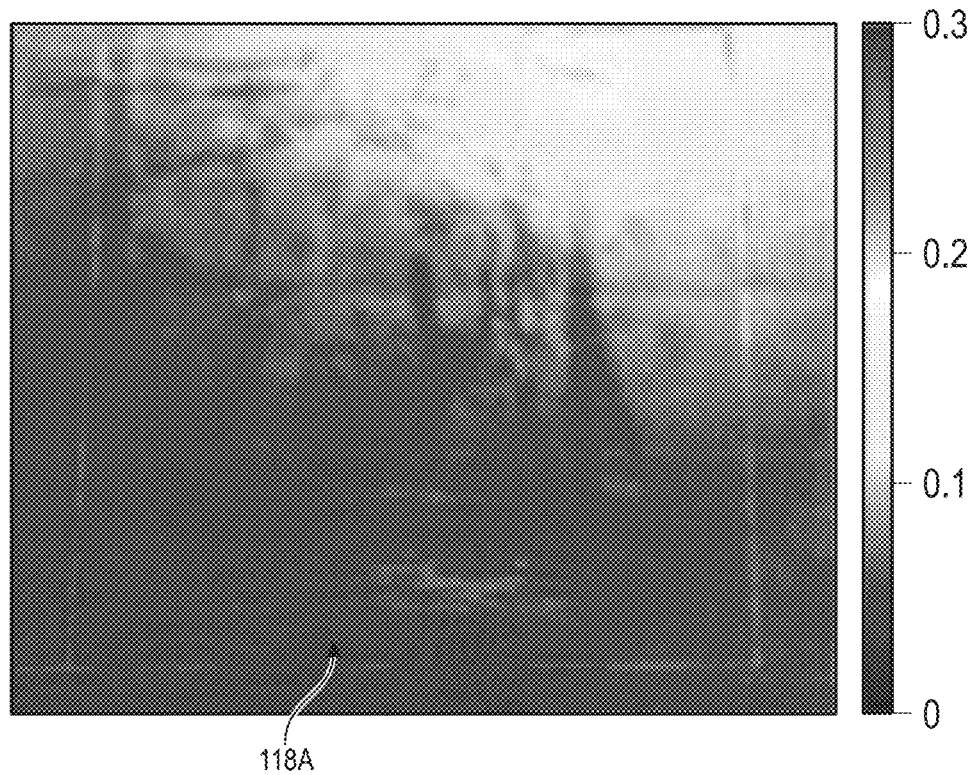

FIGS. 1A-1F illustrates a measurement setup for polarimetric imaging for detection of scratches on a front surface and back sheet of a photovoltaic module outdoors under sunlight, according to an embodiment. FIG. 1A is a schematic of the measurement setup. FIG. 1B is a photograph of a photovoltaic panel with scratches introduced on the surface, as indicated with arrows. FIG. 1C is a degree of linear polarization (DOLP) polarimetric image of the same region as that in FIG. 1B, with scratches indicated. FIG. 1D is a photograph of a back sheet of a photovoltaic panel, with the inset illustrating a magnified image with some fine scratches as indicated. FIG. 1F is a DOLP polarimetric image of the same region as shown in the inset of FIG. 1D, also shown in FIG. 1E, with scratches indicated.

FIG. 1A illustrates a measurement setup for polarimetric imaging 100 which includes a PV cell or module 102 as a representative sample of a PV sample to be evaluated or measured for defects. The location of the sun 104 and the camera 106 having a polarimetric sensor or superpixel are indicated in respective positions relative to the PV cell or module. A horizontal coordinate system 108, which is commonly referred to as an altitude/azimuth system, is a known method for describing an exact position of objects in the sky relative to objects on the ground. Moving in a direction consistent with an altitude or elevation designates an angle the object, such as the sun 104 or the camera 106 makes with a horizon relative to the PV cell or module 102. For example, if the camera 106 or the sun 104 seemed to touch the horizon, they would be considered to have an altitude of 0°, while straight above the PV cell or module 102 would be at 90°, also referred to as the zenith. Moving in a direction around the PV cell or module 102 in the arrangement shown in FIG. 1A, for example, north, south, east, or west, could be designated as an azimuth, which is characterized by an angle between one or more reference directions. For example the angular position of the sun 104 and camera 106 relative to the PV cell or module 102 could be described by its azimuth in degrees. Preliminary measurements using such a measurement device and method suggest that polarimetric images can provide highly enhanced contrast under both room light and sunlight for the detection of various PV module defects mentioned herein. The proposed methods can enable autonomous inline PV inspection with high speed, low cost, and high accuracy. For example, scratches on the PV back sheet and surface ASC/ARC layers can introduce significant change in the polarization state of reflected/scatter light, which is independent of the brightness of light. In the images collected in a study utilizing the measurement setup shown in FIG. 1A both conventional visible images and polarimetric images of the glass surface 110 and back sheet 116 of a PV module with artificially intruded scratches on both sides. The DOLP image shown in FIG. 1C for the PV front surface and FIG. 1F for the back sheet shows the scratches very clearly, which are not detectable in conventional visible images of FIG. 1B and FIG. 1D, respectively. In the PV module with surface side showing 110, a first scratch 112 and second scratch 114 shown, yet barely visible in the visible image of FIG. 1B are more clearly visible when viewed in the polarimetric image of FIG. 1C. The first scratch 112A shown in polarimetric image and the second scratch 114A shown in polarimetric image may be seen with greater visibility. In the PV module with back sheet side showing 116 shown in FIG. 1D, a third scratch 118 shown in visible image is not quite visible, but the third scratch 118A shown in polarimetric image appears much more clearly. The high contrast obtained in this image data demonstrates the use of polarimetric imaging and associated systems and methods for detection of scratches on PV module back sheets and front surface ASC/ARC layers in manufacturing quality control and early detection of scratches to allow timely O&M remedy procedures to extend the lifetime of PV panels. Quantification of these scratches in terms of location, size, area, or other factors of interest known to those skilled in the art may be compiled visually, manually or via an image detection or image analysis algorithm performed by a computer processor or similar device. It should be noted that similar measurements as the embodiment shown may be done out in field, at the service location of the PV cell or module, and not necessarily back in dark room. However, the method may also be employed in a dark room or internal room, or area as required. While certain surface scratches shown in FIGS. 1A-1F may not necessarily affect performance of a PV cell or module, degradation of performance over time may occur at the point of a crack. Polarized images reveal the scratches in FIG. 1C in the top layer is glass coated with an anti-reflective (AR) coating, and further cleaning may degrade the coating.

It should be noted that acquisition of an image from at least one or more angles, in terms of altitude and azimuth, may be conducted to achieve the best contrast for inspection. An appropriate angle of image acquisition may be determined via a combination of experimental models, theoretical models, empirical models, or combinations thereof. Further analysis of images may be done visually, manually, or could also be done via image processing algorithm to identify a scratch based on appearance or intensity metric, with or without the use of machine learning algorithms as well. As this measurement may be used with reflected light from the sun, the light source angle could depend on the angle of incident light relative to the location of the camera and the PV cell or module. While successfully employed in natural light, or in the absence of an external light source, an actual external light source may be used with this or any of the other described variations on devices or methods described herein. Furthermore, a drone, robot, or other means of positioning of the camera or imaging device may be used, for example. The camera, or image acquisition device may be designed in such a way as to acquire unfiltered images, polarized images, different polarization state images, visible images, color images, greyscales images, monochrome images, or other images simultaneously. The camera may include or incorporate a sensor or pixel array, and the image or images may be assembled, superimposed, or analyzed separately.

Figure 2A:
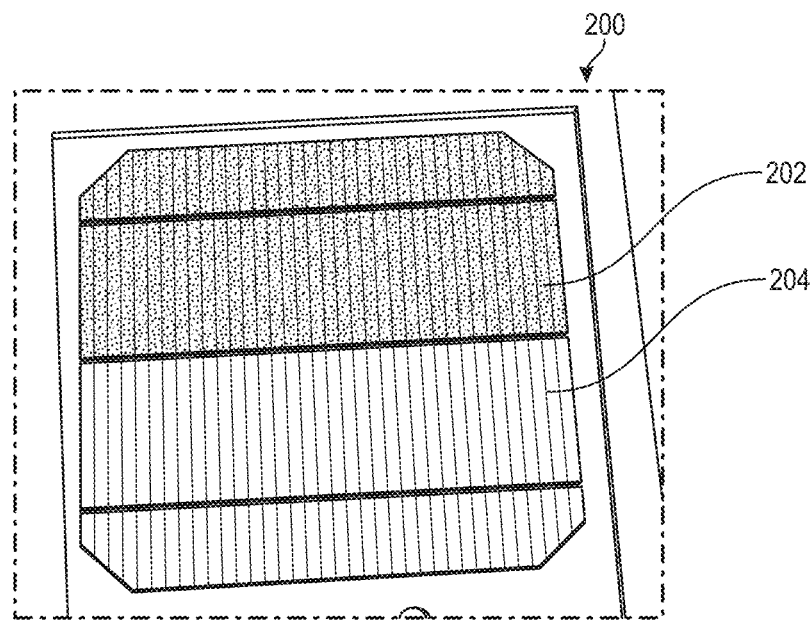
FIGS. 2A-2B illustrate polarimetric imaging for detection of a photovoltaic panel surface soiling level taken outdoors under sky light, according to an embodiment.
Figure 2B:
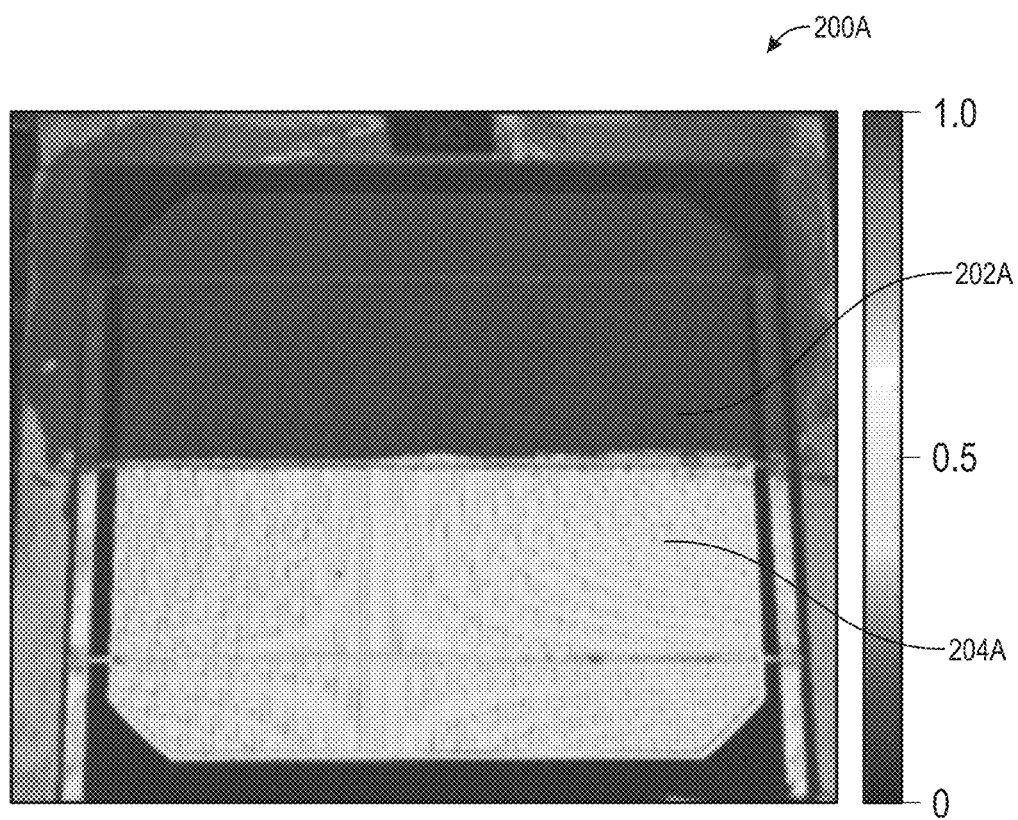

FIGS. 2A-2B illustrate polarimetric imaging for detection of a photovoltaic panel surface soiling level taken outdoors under sky light, according to an embodiment. FIG. 2A is a conventional visible image, FIG. 2B is a DOLP polarimetric image showing the same region as FIG. 2A. PV panels under natural sunlight, or sky light, show distinct polarization images, which is dependent on their relative positions with the sun and the camera. A theoretical model to calculate the sunlight polarization has been setup and used to predict the polarization images of PV panels under sunlight. Dust particles on soiled PV modules 200 scatter sunlight and could result in drastically different polarization images from cleaned ones. As shown in the images of FIGS. 2A and 2B, a single-cell PV module 200 was measured with half portion clean 204 and half portion soiled 202 outdoor under sunlight. The polarization image in FIG. 2B shows significantly enhanced contrast between the cleaned 204A and soiled surface 202A as compared with the visible image of FIG. 2A. Furthermore, different soiling levels and cementation should correlate with the DOLP (polarized) image, which can inform and guide decisions on cleaning relative to O&M scheduling.

FIGS. 3A-3C illustrate a polarimetric imaging for detection of photovoltaic panel surface soiling level outdoor under skylight, according to an embodiment. FIG. 3A is an optical image of a PV cell crack on a PV panel under UV illumination in a dark room. FIG. 3B is a visible image showing the same region as FIG. 3A, and FIG. 3C is a DOLP polarimetric image of the same sample outdoor in daylight, with cracks indicated.

PV cell cracks can strongly scatter incident light as a result of their sharp interfaces and micro gaps, and therefore result in different polarization states from that of reflected light from the flat PV surface. The images in FIGS. 3A-3C demonstrate this phenomenon and test this hypothesis in outdoor measurements. Results shown in FIGS. 3A-3C illustrate that polarimetric images can provide significant enhancement for cell cracks in a PV panel 300, as shown in FIG. 3C in daylight without the use of an external light source or illumination source. A scratched region 302 shown in FIG. 3B is more clearly shown in FIG. 3C as the same region 302A, indicating a cell crack 304 only in the polarimetric image of FIG. 3C. Optimal conditions for the best contrast and highest success rate to replace the expensive and time-consuming EL-based inspection are under development. Cell crack evaluation such as shown in FIGS. 3A-3C may be done in field, or at a service location of a PV cell or module, while conventional state of the art measurements cannot be done in the field without expensive camera methods or transporting panels into a controlled location. Conventional analysis methods can also not be done in the daytime or may require a destructive aspect of the measurement in a determination of delamination defects or failures. This metric may be used in both field inspection and in quality control of PV modules, cells, or panels.

Figure 4A:
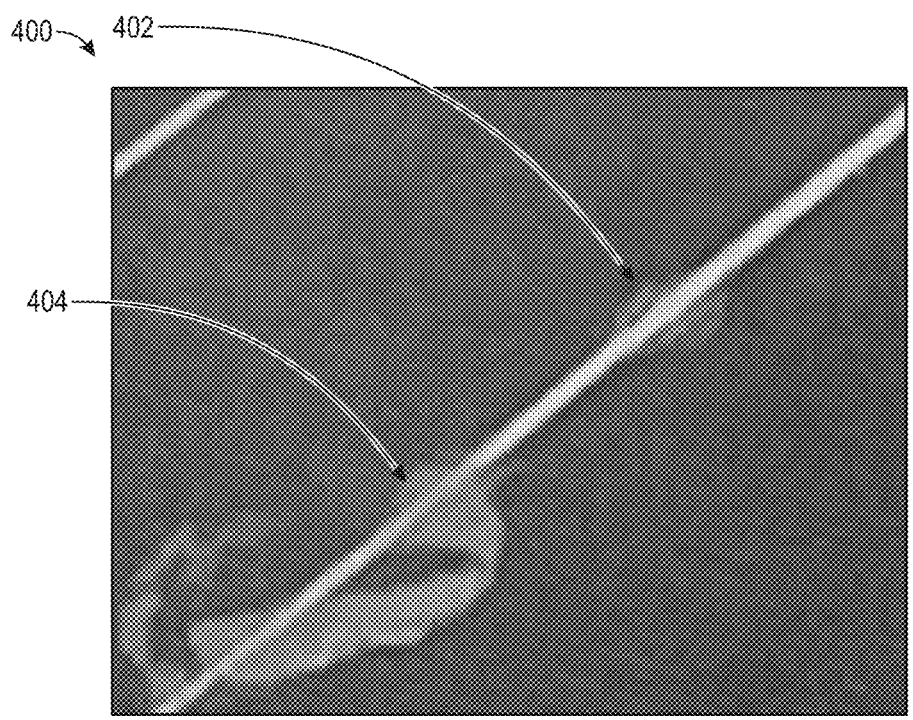
FIGS. 4A and 4B show polarimetric detection of encapsulant delamination, according to an embodiment.
Figure 4B:
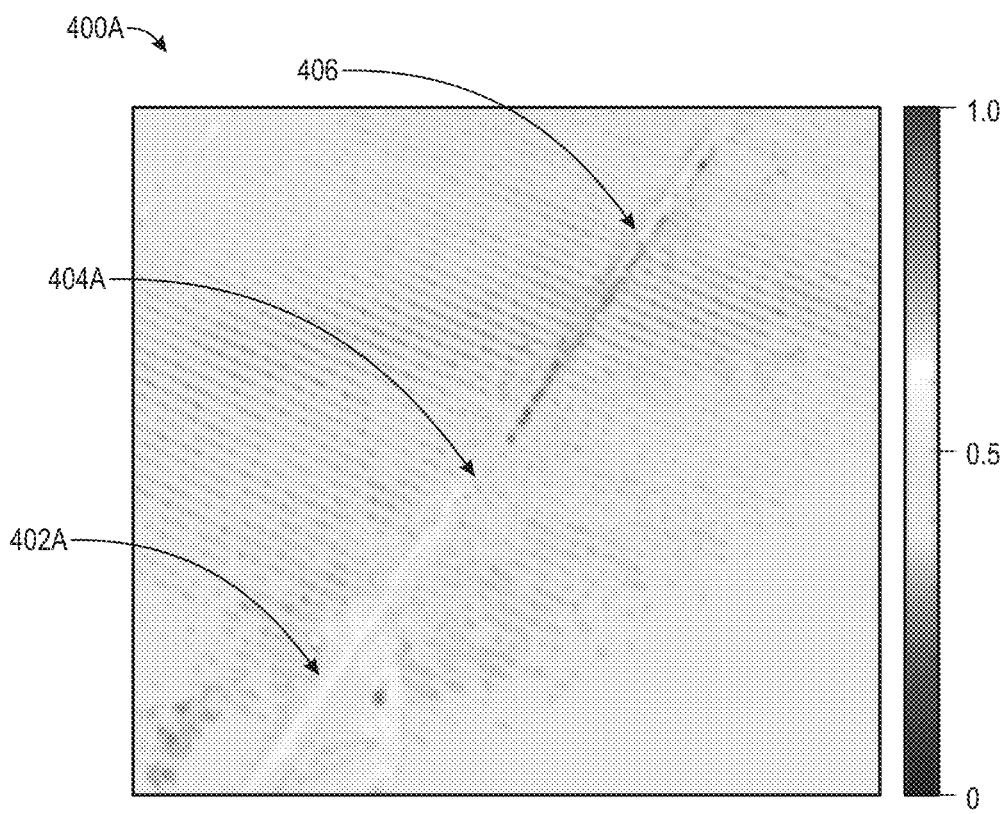

FIGS. 4A and 4B show polarimetric detection of encapsulant delamination, according to an embodiment. FIG. 4A is an optical image of a PV panel with delamination issues. FIG. 4B is a degree of circular polarization (DOCP) image of the same region, with the delamination regions indicated. As shown in FIG. 4A, a section of a PV panel 400 exhibits several areas of delamination 402, 404. Any defects of the encapsulation layers, such as delamination, discoloration and varying gel content, result in the geometric and/or optical index changes in the multi-layer thin-film structures on top of the silicon wafer, which, based on theoretical analysis, lead to changes of the polarization states of reflected light. This hypothesis was tested with a white light source and a PV panel with delamination issues in the lab. The polarization image (DOCP) shown in FIG. 4B shows the delaminated regions 402A, 404A, 406 with increased DOCP. This manner of detection of encapsulant discoloration/delamination and gel content may be used in manufacturing quality control and field failure analysis.

Figure 5:
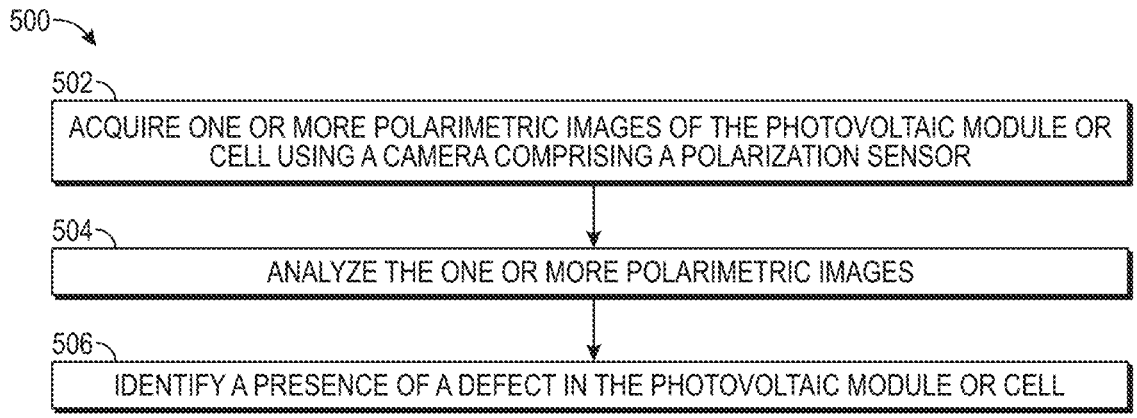
FIG. 5 is a flowchart illustrating a method for inspection for a photovoltaic module or cell, according to an embodiment.

FIG. 5 is a flowchart illustrating a method for inspection for a photovoltaic module or cell, according to an embodiment. A method for inspection for a photovoltaic module or cell 500 is described in FIG. 5, which includes a step to acquire one or more polarimetric images of the photovoltaic module or cell using a camera comprising a polarization sensor 502, followed by a step to analyze the one or more polarimetric images 504, and finally to identify a presence of a defect in the photovoltaic module or cell 506. The method for inspection for a photovoltaic module or cell 500 may also include inputting a first location of the camera into a predetermined model, inputting a first location of the photovoltaic module or cell into the predetermined model, and adjusting the first location of the camera to a second location of the camera based on an output of the predetermined model prior to acquiring one or more polarimetric images of the photovoltaic module or cell. The method for inspection for a photovoltaic module or cell 500 may alternately include employing the method where the second location of the camera is within ±20 degrees of the first location of the camera. This and other references of degrees of position or location may be in terms of either altitude or azimuth, as described previously. The method for inspection for a photovoltaic module or cell 500 may incorporate acquiring the one or more polarimetric images from more than one location relative to a location of the photovoltaic module or cell, or by analyzing the one or more polarimetric images further comprises fitting the one or more polarimetric images to a mathematical model in certain embodiments. The method for inspection for a photovoltaic module or cell 500 may include an analysis of the one or more polarimetric images is by visual inspection or by an image processing algorithm.

Certain embodiments of the method for inspection for a photovoltaic module or cell 500 may include determining a situation or state where no defect is present in the photovoltaic module or cell and adjusting a first location of the camera to a second location of the camera based on an output of the predetermined model prior to acquiring one or more polarimetric images of the photovoltaic module or cell. The method for inspection for a photovoltaic module or cell 500 may include a step of providing a prediction of expected life of the photovoltaic module or cell based on a quantitative measurement of the defect or providing loss of efficiency of the photovoltaic module or cell based on a quantitative measurement of the defect. Alternate embodiments of the method for inspection for a photovoltaic module or cell 500 may use no external light source when acquiring one or more polarimetric images of the photovoltaic module or cell uses or may include the use of an external light source when acquiring one or more polarimetric images of the photovoltaic module or cell. In exemplary embodiments of the method for inspection for a photovoltaic module or cell 500, analyzing the one or more polarimetric images includes correlating a defect present to a geographical location of the photovoltaic module or cell or may include correlating a defect present to meteorological data associated with a geographical location of the photovoltaic module or cell. Defects detected or evaluated utilizing the method for inspection for a photovoltaic module or cell 500 may include a crack, a discoloration, a scratch, a surface contamination, a geometric change, an optical index change, or a combination thereof in certain embodiments. Other embodiments may include a step to transmit data related to any defect detected by the method for inspection for a photovoltaic module or cell 500 to an external device, such as a remote computer processing unit, or data processing unit. Quantitative level of soiling or other metrics may be determined by the method for inspection for a photovoltaic module or cell 500. Furthermore, a prediction of PV cell, module, or panel life or efficiency loss can be determined with a quantitative measurement of the defect data acquired and analyzed by the method for inspection for a photovoltaic module or cell 500. Any data or images or analysis acquired may further be correlated to regional differences of PV module locations, localized weather patterns, and the like, to enable prediction and determination of cleaning or maintenance intervals in the field.

Figure 6:
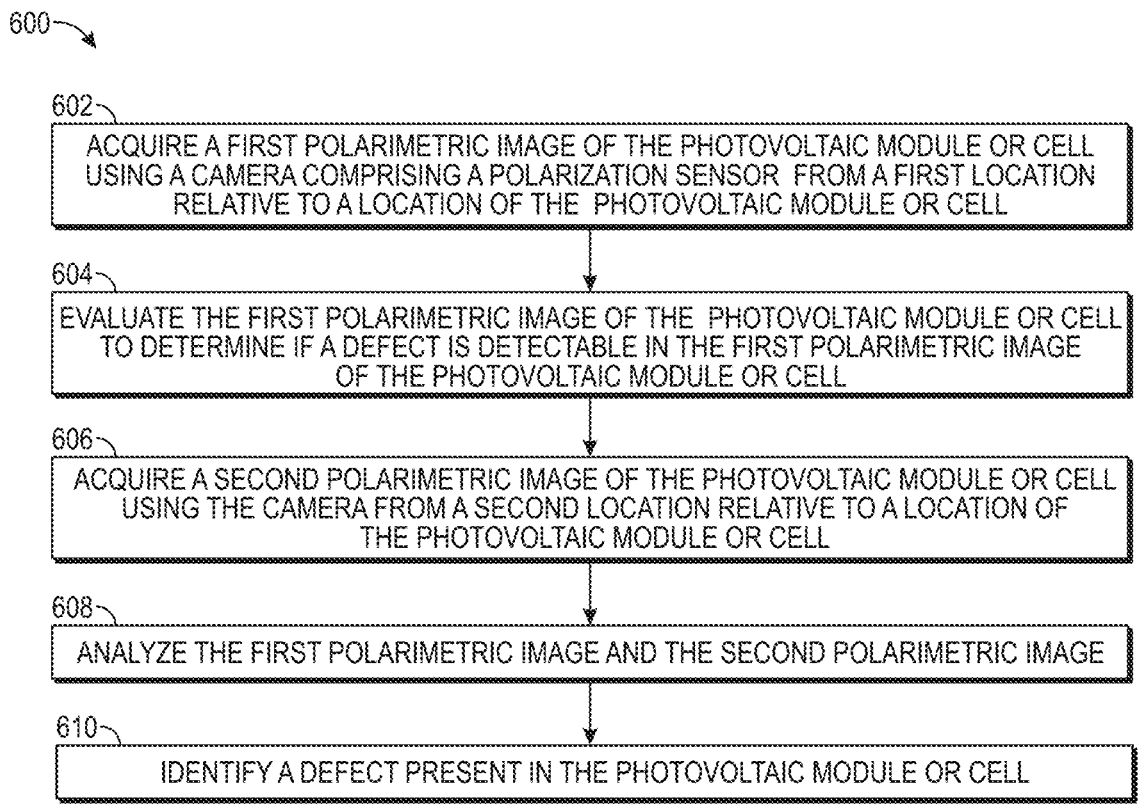
FIG. 6 is a flowchart illustrating a method for inspection for a photovoltaic module or cell, according to an embodiment.

FIG. 6 is a flowchart illustrating a method for inspection for a photovoltaic module or cell, according to an embodiment. A method for inspection for a photovoltaic module or cell 600, as illustrated in FIG. 6, includes a step to acquire a first polarimetric image of the photovoltaic module or cell using a camera comprising a polarization sensor from a first location relative to a location of the photovoltaic module or cell 602 followed by a step to evaluate the first polarimetric image of the photovoltaic module or cell to determine if a defect is detectable in the first polarimetric image of the photovoltaic module or cell 604. Next, a second polarimetric image of the photovoltaic module or cell is acquired using the camera from a second location relative to a location of the photovoltaic module or cell 606 followed by analyzing the first polarimetric image and the second polarimetric image 608. Finally identifying a defect present in the photovoltaic module or cell 610 is completed. Certain embodiments of the methods described previously may incorporate steps of controlling an angle of incident light relative to the PV module being inspected, controlling an angle of the camera or image acquisition device relative to the PV module being inspected, or a combination of both. It should be noted that the light source may be natural sunlight or daylight, external artificial light, or a combination of daylight and artificial light, or other light sources known to those skilled in the art, such as ultraviolet, polarized, infrared, and the like.

Results of using the aforementioned device and methods for autonomous polarimetric imaging for photovoltaic module inspection show that polarimetric images show high contrast for detection of PV cell micro-cracks, scratches and/or cuts on PV panel top surfaces and back sheets, soiling levels, and other similar defects. Polarimetric imagers based on these devices and methods exhibit negligible weight and size increase (<0.1%) compared with conventional imagers and successfully measure and quantify a number of PV defects including cracks, scratches, encapsulant discoloration and gel content, back sheet scratches, and soiling level. Methods and devices may be used as described herein, employing ultra-compact polarimetric imaging systems for non-interruptive, rapid and accurate inspection of PV cells and modules under prevailing room light or sunlight conditions. This may also enable the use of polarimetric imaging technology for applications to PV manufacturing and plants for optical inspections of various PV module defects with high speed, low cost and inline operation. These polarimetric inspection systems may further be integrated into and onto drones and robotics for automatic and high-speed inspection and collaborate with PV plant and labs to perform field tests. The inspection methods and devices as described herein may be used in PV field inspection and enable system operators to monitor degradation or failure of individual modules and results in less costly O&M by efficient identification, prioritization, and preparation of module replacement. Moreover, the application of the described methods and devices for manufacturing quality control can enable the extension of system lifetime by identifying and eliminating the defective modules, thereby amortizing the initial capital costs over a longer timeframe and reducing LCOE by improving lifetime from about 30 to about 50 years.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A method for inspection of a photovoltaic module or cell, comprising:
    acquiring one or more polarimetric images of the photovoltaic module or cell using a camera comprising a polarization sensor comprising a superpixel;
    analyzing the one or more polarimetric images;
    identifying a presence of a defect in the photovoltaic module or cell;
    inputting a first location of the camera into a predetermined model;
    inputting a first location of the photovoltaic module or cell into the predetermined model; and
    adjusting the first location of the camera to a second location of the camera based on an output of the predetermined model prior to acquiring one or more polarimetric images of the photovoltaic module or cell; and wherein:
    the second location of the camera is within ±20 degrees of the first location of the camera.

2. The method for inspection of a photovoltaic module or cell of claim 1, wherein acquiring the one or more polarimetric images is completed from more than one location relative to a location of the photovoltaic module or cell.

3. The method for inspection of a photovoltaic module or cell of claim 1, wherein analyzing the one or more polarimetric images further comprises fitting the one or more polarimetric images to a mathematical model.

4. The method for inspection of a photovoltaic module or cell of claim 1, wherein analyzing the one or more polarimetric images is done by visual inspection.

5. The method for inspection of a photovoltaic module or cell of claim 1, wherein analyzing the one or more polarimetric images is done by an image processing algorithm.

6. The method for inspection of a photovoltaic module or cell of claim 1, further comprising:
    determining no defect is present in the photovoltaic module or cell; and
    adjusting the second location of the camera to another location of the camera based on an output of the predetermined model prior to acquiring one or more polarimetric images of the photovoltaic module or cell.

7. The method for inspection of a photovoltaic module or cell of claim 1, further comprising providing a prediction of expected life of the photovoltaic module or cell based on a quantitative measurement of the defect.

8. The method for inspection of a photovoltaic module or cell of claim 1, further comprising providing loss of efficiency of the photovoltaic module or cell based on a quantitative measurement of the defect.

9. The method for inspection of a photovoltaic module or cell of claim 1, wherein acquiring one or more polarimetric images of the photovoltaic module or cell uses an external light source.

10. The method for inspection of a photovoltaic module or cell of claim 1, wherein analyzing the one or more polarimetric images further comprises correlating a defect present to a geographical location of the photovoltaic module or cell.

11. The method for inspection of a photovoltaic module or cell of claim 1, wherein analyzing the one or more polarimetric images further comprises correlating a defect present to meteorological data associated with a geographical location of the photovoltaic module or cell.

12. The method for inspection of a photovoltaic module or cell of claim 1, wherein the defect is a crack, a discoloration, a scratch, a surface contamination, a geometric change, an optical index change, or a combination thereof.

13. The method for inspection of a photovoltaic module or cell of claim 1, further comprising transmitting data related to the defect to an external device.

14. A method for inspection of a photovoltaic module or cell, comprising:
    illuminating a photovoltaic module or cell;
    acquiring a first polarimetric image of the photovoltaic module or cell using a camera comprising a polarization sensor comprising a superpixel from a first location relative to a location of the photovoltaic module or cell;
    evaluating the first polarimetric image of the photovoltaic module or cell to determine if a defect is detectable in the first polarimetric image of the photovoltaic module or cell;
    acquiring a second polarimetric image of the photovoltaic module or cell using the camera from a second location relative to a location of the photovoltaic module or cell;
    analyzing the first polarimetric image and the second polarimetric image; and identifying the nature of a defect if determined as present in the photovoltaic module or cell; and wherein:
the second location of the camera is within ±20 degrees of the first location of the camera.

15. The method for inspection of a photovoltaic module or cell of claim 1, further comprising acquiring one or more polarimetric images of the photovoltaic module or cell in a dark environment.

* * * * *